W. T. ESTBERG.
AUTOMOBILE LOCK.
APPLICATION FILED MAY 23, 1919.
1,329,114.
Patented Jan. 27, 1920.
3 SHEETS—SHEET 2.
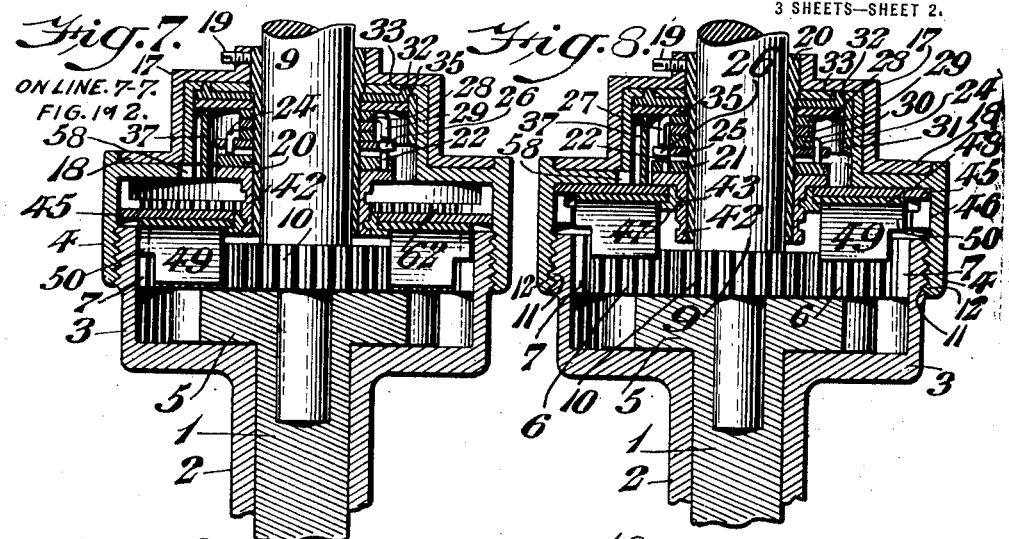
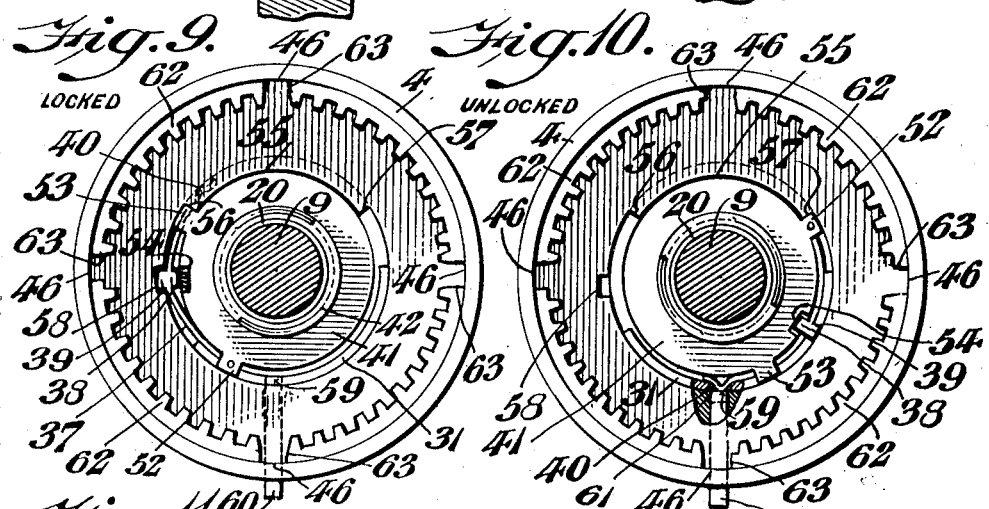
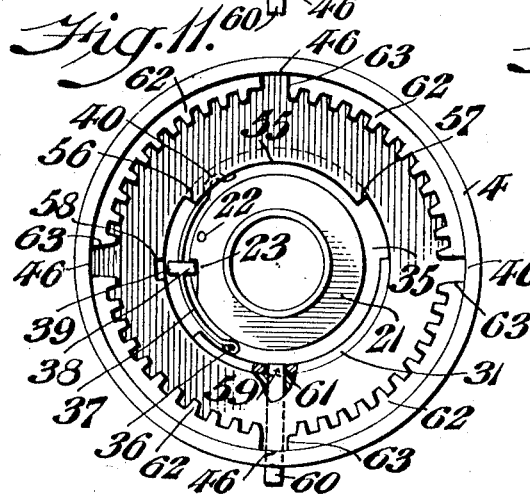
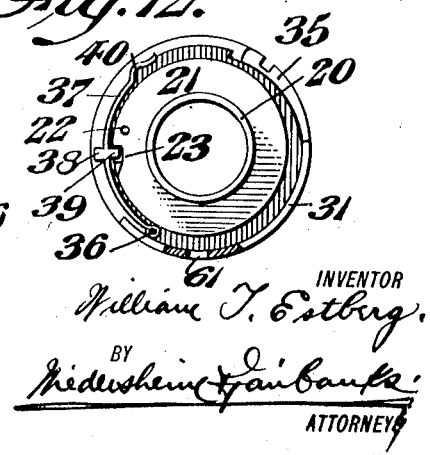
INVENTOR
William T. Estberg.
BY
Friedensheim Fairbanks
ATTORNEYS

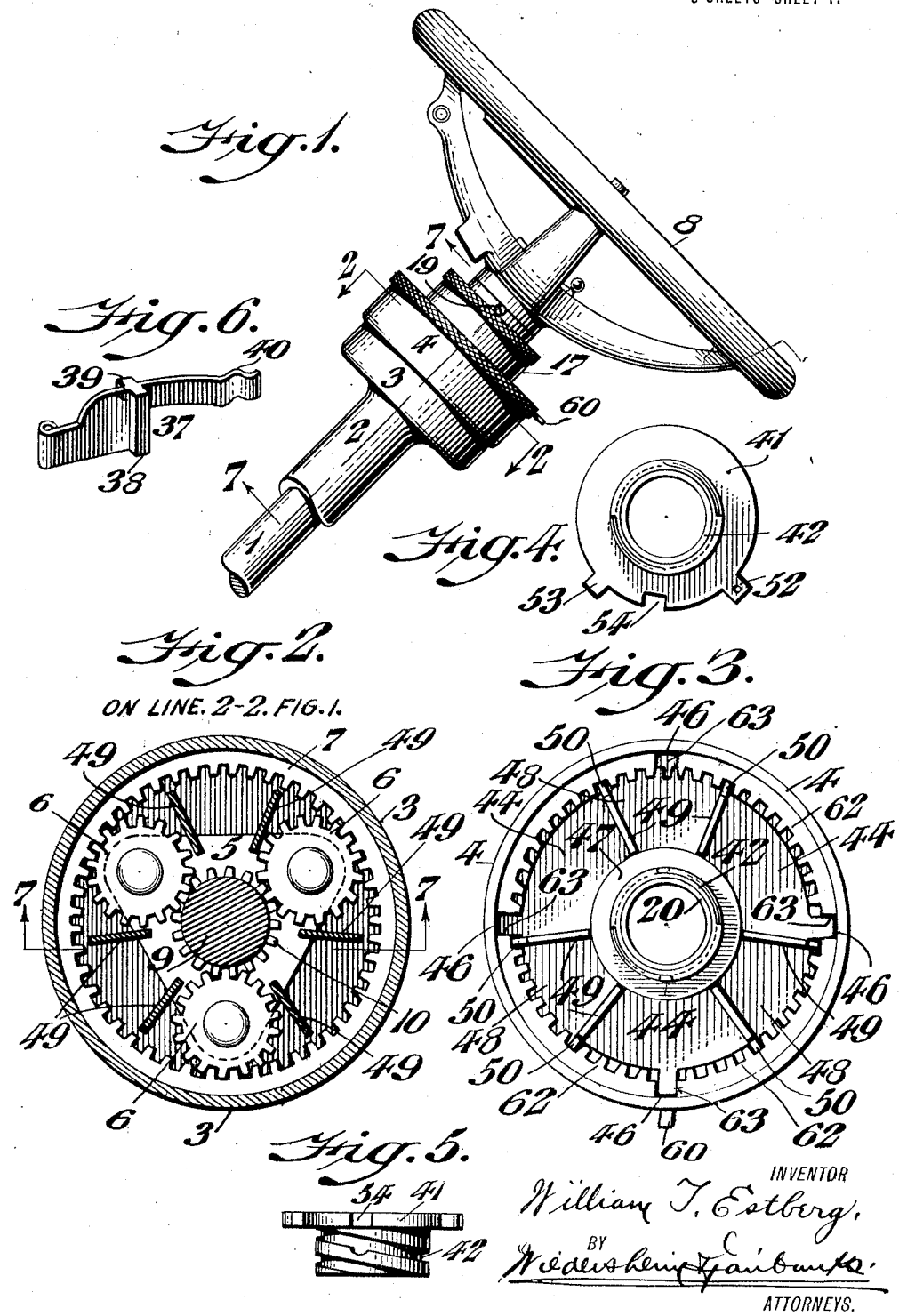

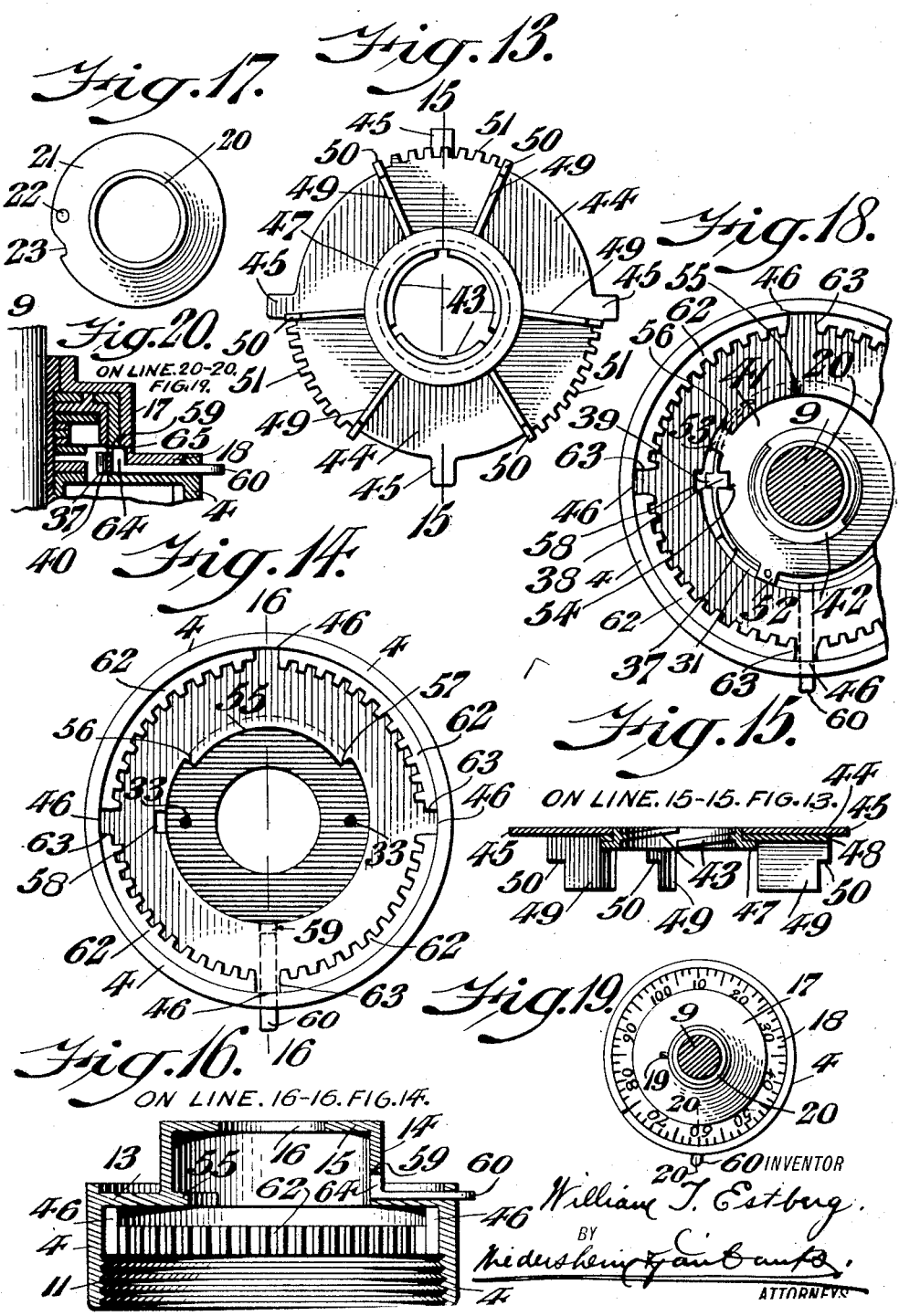

UNITED STATES PATENT OFFICE.

WILLIAM T. ESTBERG, OF CAMDEN, NEW JERSEY, ASSIGNOR TO PENN PRESSED METAL CO., OF CAMDEN, NEW JERSEY, A CORPORATION OF NEW JERSEY.

AUTOMOBILE-LOCK.

1,329,114.  Specification of Letters Patent.  Patented Jan. 27, 1920.

Application filed May 23, 1919. Serial No. 299,151.

*To all whom it may concern:*

Be it known that I, WILLIAM T. ESTBERG, a citizen of the United States, residing at Camden, county of Camden, State of New Jersey, have invented a new and useful Automobile-Lock, of which the following is a specification.

My present invention relates to a novel construction and arrangement of an automobile lock which is controlled by a combination so that an unauthorized person or a person not familiar with the combination will be unable to unlock the car so that it can be operated.

It further comprehends a novel construction of an automobile lock which is carried by a cap which, when the parts are in locked position, is locked with respect to the steering column so that it cannot be removed without first actuating the combination to effect the unlocking of the lock.

It further comprehends a novel construction and arrangement of a locking member which is raised and lowered by means of a worm, and the movement of the worm is controlled by means of a combination.

It further comprehends novel means for preventing the locking mechanism becoming actuated due to the vibration of the motor vehicle when running.

It further comprehends a novel construction and arrangement of a worm, novel means for operating said worm and novel means for controlling the operation of said worm.

It further comprehends a novel construction and arrangement of a cap which is detachably connected with the steering column and interlocked therewith when the locking member of the lock is in locked position.

Other novel features of construction and advantage will hereinafter more clearly appear in the detailed description and the appended claims.

For the purpose of illustrating my invention, I have shown in the accompanying drawings a typical embodiment of it which in practice will give satisfactory and reliable results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 represents, in perspective, a steering post and its adjuncts, in conjunction with which an automobile lock embodying my invention is employed.

Fig. 2 represents a section on line 2—2 of Fig. 1.

Fig. 3 represents, in detached position, a bottom plan view of the cap and certain elements of the locking mechanism carried thereby.

Fig. 4 represents a top plan view of a worm sleeve employed.

Fig. 5 represents a side elevation of the worm sleeve seen in Fig. 4.

Fig. 6 represents, in perspective and in detached position, a spring member employed.

Fig. 7 represents a section on line 7—7 of Figs. 1 and 2.

Fig. 8 represents a section, similar to that seen in Fig. 7, showing certain of the parts in a different relation from that seen in Fig. 7.

Fig. 9 represents a bottom plan view of the cap with certain parts removed for the sake of clearness of illustration.

Fig. 10 represents a bottom plan view of the cap, similar to that seen in Fig. 9, but showing certain of the parts in a different relation from that seen in Fig. 9.

Fig. 11 represents a bottom plan view of the cap with certain parts removed, and showing certain of the parts in a different relation from that seen in Figs. 9 and 10.

Fig. 12 represents a bottom plan view of certain cams, and means for locking them.

Fig. 13 represents a bottom plan view of the locking member and certain of its adjuncts.

Fig. 14 represents a bottom plan view of the cap and its adjuncts, certain parts having been removed for the sake of clearness of illustration.

Fig. 15 represents a section on line 15—15 of Fig. 13.

Fig. 16 represents a section on line 16—16 of Fig. 14.

Fig. 17 represents a bottom plan view of a sleeve and one of the tumblers.

Fig. 18 represents a bottom plan view of the cap and its adjuncts, with the parts in the position they assume when the proper combination has been effected.

Fig. 19 represents a top plan view of the dial cap.

Fig. 20 represents a section on line 20—20 of Fig. 19.

Similar numerals of reference indicate corresponding parts.

Referring to the drawings.

1 designates a steering post which is rotatably mounted within the steering column 2, which latter at its upper end is enlarged to form the gear casing 3, with which is in threaded engagement a cap 4 constructed in accordance with my present invention and adapted to carry as a unit the locking mechanism and the combination which controls it, as will be hereinafter fully explained. The steering post 1 is enlarged at its upper end as at 5, as will be understood by reference to Figs. 7 and 8, to form a support for the planetary gearing which includes the three pinions 6 rotatably mounted on the support 5 and adapted to mesh with the internal gear 7 secured within the gear casing 3. The steering wheel 8 is secured in the usual manner to a shaft 9 which has a bearing in the steering post 1 and is provided with a gear 10 which meshes with the pinion 6.

The construction thus far described, except my novel cap 4, is a well known form of steering mechanism, in which, in lieu of the cap 4, an ordinary screw cap is employed. My present invention is applied to steering mechanism of this type by simply removing the ordinary cap from the gear casing 3, by unscrewing it, and then screwing on the cap 4 which is provided with the internally threaded portion 11 for such purpose, the upper end of the gear casing 3 being externally threaded as at 12.

The cap 4 is provided with a laterally extending flange 13 which extends inwardly to a point below the upper end of the circular wall of the cap and merges into an outwardly extending bonnet 14, which is provided at its upper end with an inwardly extending flange 15 which is apertured as at 16. 17 designates a combination dial cap which is rotatably mounted on the bonnet 14 and has at its bottom a laterally extending flange 18 which forms a dial which is provided with graduations, and the upper face of the cap above the flange 13 is provided with a notch or other marking to coöperate with the graduations on the dial, so that the operator will know when the proper combination has been made. The cap 17 has fixed to it, by means of a set screw 19, a sleeve 20 which is freely rotatable on the post or shaft 9.

The sleeve 20 has fixed to it, in any desired manner, a tumbler disk 21 having an upwardly projecting pin 22 and a notch 23 in its periphery. The pin 22, when the sleeve 20 is rotated, travels in the path of a pin 24 carried by a tumbler disk 25 loosely mounted on the sleeve 20 and provided with a notch 26 in its periphery. The pin 24 moves in the path of a pin 27 carried by a tumbler disk 28 loosely mounted on the sleeve 20.

Interposed between the disk 28 and the disk 21 are two spacing members 29 and 30, respectively. 31 designates a cup-shaped member, the upper face of which is provided with outwardly projecting lugs 32 which are received in apertures 33 of the bonnet 14 which is integral with the cap 4. 35 designates a disk loosely mounted on the sleeve 20, and this disk 35 carries a pin or set screw 36 which is also fixed to the worm disk 41 so as to move in unison with it. This pin 36 has mounted on it a spring detent 37, which is provided with opposed lugs 38 and 39 respectively, from which extends a spring member, which is deflected in proximity to its forward end to form the cam-shaped locking portion 40. The disk 41 is provided with a worm 42 which engages a worm thread 43, see Fig. 15, which is carried by a disk 44 having extending from its periphery tongues 45, which, when the parts are assembled, are positioned in slots 46 in the inner periphery of the cap 4. The worm sleeve 43 is provided with a laterally extending flange 47 between which and the disk 44 is positioned the body portion of a locking member 48. This locking member 48 consists of a disk freely rotatable on the worm sleeve and having portions cut out and deflected downwardly to form the flanges 49 which are cut away at their outer periphery to form the teeth 50, and if desired the outer periphery of the straight portion of the member 48 may also be provided with teeth, as indicated at 51, see more particularly Fig. 13. The worm disk 41, see Fig. 4, is provided with a peripheral lug 52 into which the fastening device 36 extends, and this lug 52 serves as a stop lug. A peripheral lug 53 on the worm disk 41 also serves as a stop lug. The periphery of the worm disk 41 is also provided with a peripheral recess 54. The bonnet 14 at its bottom merges into a flange 55 which is cut away to form stop shoulders 56 and 57. 58 is a peripheral recess adapted to receive at certain times the lug 39 of the spring detent 37. A recess 59 is also provided which receives at certain times the deflected portion 40 of the spring detent 37. A locking plunger 60 is provided for the dial cap and extends laterally in the cap 4, and has its inner end adapted to enter the recess 59 which registers with a recess 61 in the flange 31, so that when the parts are in unlocked position there will be no likelihood of the vibration of the car causing the locking mechanism to become locked, as at this time the cam-shaped locking portion of the spring detent 37 is in position to retain the lug 64 of the plunger 60 in the slot or recess 65 in the dial cap, see more particularly Fig. 20.

A toothed member or gear 62 is secured within the cap 4, or formed integral with it, and, if formed integral, it is provided with the slots 63 in order that the lugs 45 of the disk 44 may pass therethrough into their proper position within the cap 4.

Assuming now that it is desired to apply my novel construction of combination controlled locking mechanism to the steering column of a car in which the steering post is provided with a planetary gearing, the ordinary cap is unscrewed and a cap 4 and its adjuncts, embodying my invention, is screwed on the gear casing of the steering column. The steering wheel is secured in position in the usual manner.

If we assume now that the parts are in their unlocked position, as seen in Fig. 10, and it is desired to lock them, the operator pushes the locking plunger 60 inwardly to release the dial cap 17 and then turns the dial cap 17 in a clockwise direction. This causes the sleeve 20 to turn as well as the disk 21, and the pin 22 causes the next superimposed disk to turn by its engagement with the pin 24, thereby rotating the disk 25. The pin 24 contacts with the pin 29 and turns the disk 28. This brings the notches 23 and 26 into registering position to receive the lug 38 carried by the spring pressed detent 37, and the lug 38 interlocks with the recess 54 of the worm disk 41 with which it is now in register, so that the worm disk or sleeve 41 is rotated. This causes the worm 42 to turn and as this meshes with the threaded portion or worm sleeve 43 of the locking member, the locking member is moved from the position seen in Fig. 8 into that seen in Fig. 7. The locking teeth 51 are now in engagement with the teeth of the internal gear 62 and also with the teeth of the internal gear 7 so that it is now impossible to turn the steering wheel 8 to effect the rotation of the steering post 1 or to remove the cap 4 from the gear casing 3. When the parts are in unlocked position the cam portion 40 of the spring detent 37 moves the plunger 60 outwardly and locks the dial cap, so that there is no likelihood of the locking mechanism becoming accidentally locked due to vibration of the car or other causes. At this time the lug 52 contacts with the stop shoulder 57 as seen in Fig. 10.

The lug 39 of the spring detent 37 moves into the recess 58 and prevents any rotation of the tumbler disk which carries the detent 37. The dial cap 17 can now be turned freely in either direction without effecting the locking member, unless the proper combination has been made.

Assuming now that it is desired to lock the locking mechanism, the operator first pushes inwardly the locking plunger 60, which releases the dial cap 17 so that it can be turned. The operator first turns the dial cap 17 in one direction to bring the proper marking on the dial into register with the marking on the cap 4, and then turns the dial cap 17 in a reverse direction. This movement of the dial cap 17 brings the recesses or notches 23, 26 and 54 into register and the lug 38 of the detent moves into such recesses and the worm sleeve 42 is turned to thereby raise the locking member upwardly and cause the teeth 50 to move out of engagement with the internal gear 7. As the locking members are loosely carried by the disk 44, they do not interfere with the revolution of the pinions 6 which form a part of the planetary gearing. It will now be understood that, when the steering wheel is turned, the gear 10 will rotate the pinions 6 in the usual manner and the steering post 1 can be turned as desired. When the parts are locked, the lug 53 contacts with the shoulder 56, and the spring pressed detent 37 bearing against the wall of the cap 4 causes the lug 39 to engage the walls of the recess 58 of the cap 4.

It will be understood from the foregoing that, in accordance with my present invention, I provide a locking member which is controlled by a combination lock to lower it into position by means of a worm sleeve and to move it out of locking position by means of such worm sleeve. When the locking member is in locked position it interlocks with the internal gear 7 carried by the gear casing 3 and also with the internal gear 62 carried by the cap 4, so that not only is the rotation of the steering post 1 prevented but the cap 4 is locked with respect to the gear casing 3 so that it cannot be removed until the locking member has been moved into its unlocked position by the proper actuation of the combination.

By the employment of my present invention, the front wheels of the automobile can be turned at any desired angle and the steering post then locked, so that the car cannot be towed away by an unauthorized person; and the locking mechanism cannot be unlocked to permit the turning of the steering post except by a person who knows the combination.

When the locking member is in unlocked position the dial cap 17 is positively locked.

It will now be apparent that I have devised a novel and useful construction of an automobile lock which embodies the features of advantage enumerated as desirable in the statement of the invention and the above description, and while I have, in the present instance, shown and described preferred embodiments thereof which will give in practice satisfactory and reliable results, it is to be understood that such embodiments are susceptible of modification in various particulars without departing from the spirit or scope of the invention or sacrificing any of its advantages.

Having thus described my invention, what I claim as new and desire to secure by Letters Patent, is:—

1. In an automobile locking mechanism, the combination with the gear case and its internal gear, of a removable cap for said gear case provided with an internal gear, a locking member, and means to cause said locking member to interlock with said gears to prevent the removal of said cap from said gear case.

2. In an automobile lock, the combination with the gear case and its internal gear, of a removable cap for said gear case provided with an internal gear, a locking member interlocking with the internal gear of said cap and free to revolve when in unlocked position, and means to move said locking member into a position to interlock with both of said gears.

3. In an automobile locking mechanism, the combination with a steering gear case and its internal gear, of a cap detachably carried by said gear case, and locking mechanism within said cap comprising the following elements:—a locking member, a worm to move said member into and out of engagement with said gear, a manually controlled locking device operatively connected with said worm to actuate it, and a detent controlled by said locking device to retain it in unlocked position.

4. In an automobile locking mechanism, the combination with the steering gear case and its internal gear, of a cap connected to said case and provided with a toothed member, a dial cap rotatable on said first cap, a sleeve fixed to said dial cap, a worm rotatable on said sleeve, a combination locking device actuated by said sleeve and operatively connected with said worm to actuate it, and a locking member actuated by said worm and interlocking with said toothed member and with said internal gear when in locked position.

5. In an automobile locking mechanism, the combination with the steering gear case and its internal gear, of a cap connected to said case and provided with a toothed member, a dial cap rotatable on said first cap, a sleeve fixed to said dial cap, a worm rotatable on said sleeve, a combination locking device actuated by said sleeve and operatively connected with said worm to actuate it, a locking member actuated by said worm and interlocking with said toothed member and with said internal gear when in locked position, and means actuated by said locking device to lock the dial cap against rotation when the locking member is in unlocked position.

6. In an automobile locking mechanism, the combination with the steering gear case and its internal gear, of a cap detachably connected with said case and provided with a toothed member and provided with stops, of a locking member, a worm provided with stop members to engage the stop on said cap, said worm being operatively connected to said locking member to cause it to interlock with both said toothed member and said internal gear, combination controlled tumblers operatively connected with said worm, and a spring pressed detent carried by one of said tumblers and adapted to interlock with said worm and thereby actuate it.

7. In an automobile locking mechanism, the combination with the steering gear case and its internal gear, of a cap detachably connected with said case and provided with a toothed member and provided with stops, of a locking member, a worm provided with stop members to engage the stop on said cap, said worm being operatively connected to said locking member to cause it to interlock with both said toothed member and said internal gear, combination controlled tumblers operatively connected with said worm, a spring pressed detent carried by one of said tumblers and adapted to interlock with said worm and thereby actuate it, and means controlled by said detent to prevent operation of said worm when said locking member is in unlocked position.

8. In an automobile locking mechanism, the combination with a steering post and the gears connecting with it, of a locking member having means to engage all of said gears to prevent operation of the steering mechanism, a worm operatively connected with said locking mechanism to actuate it, and a locking device operatively connected with said worm to actuate it.

9. In an automobile locking mechanism, the combination with the gear case, steering post and the gears for operating it, of a cap connecting with said case, a disk nonrotatably mounted in said cap and capable of perpendicular movement, a locking member freely rotatable on said disk a worm operatively connected with said disk to move said locking member into and out of its locking position, and a combination lock controlling the operation of said worm.

10. In an automobile locking mechanism, the combination with the gear case and the internal gear of the steering mechanism, of a locking member having teeth to engage said gear to prevent operation of the steering mechanism, a worm operatively connected with said locking member to actuate it, a combination locking device to control said worm, and manually releasable means controlled by said combination locking device when the parts are in unlocked condition to render the combination locking device inoperative.

11. In an automobile locking mechanism, the combination with the gear case and the internal gear of the steering mechanism, of a disk nonrotatably mounted but capable of perpendicular movement, a worm sleeve carried by said disk, a locking member freely rotatable on said worm sleeve and having a series of spaced teeth at its periphery to engage said internal gear, a worm in engagement with said worm sleeve to raise or lower it and thereby move said locking member into locked or unlocked position, and actuating means for said worm.

12. In an automobile locking mechanism, the combination with the gear case and the internal gear of the steering mechanism, of a disk nonrotatably mounted but capable of perpendicular movement, a worm sleeve carried by said disk, a locking member freely rotatable on said worm sleeve and having a series of spaced teeth at its periphery to engage said internal gear, a worm in engagement with said worm sleeve to raise or lower it and thereby move said locking member into locked or unlocked position, actuating means for said worm, and a cap connected with said gear case and within which said worm and said worm actuating means are contained and removable as a unit of structure therewith.

13. In an automobile locking mechanism, the combination with the gear case and the internal gear of the steering mechanism, of a disk nonrotatably mounted but capable of perpendicular movement, a worm sleeve carried by said disk, a locking member freely rotatable on said worm sleeve and having a series of spaced teeth at its periphery to engage said internal gear, a worm in engagement with said worm sleeve to raise or lower it and thereby move said locking member into locked or unlocked position, actuating means for said worm, a cap connecting said gear case, and a toothed member carried by said cap and with which said locking member interlocks when in locked position to prevent removal of said cap from said gear case.

14. In an automobile locking mechanism, the combination with the gear case and the internal gear of the steering mechanism, of a locking member to engage with said gear, a worm operatively connected with said locking member to actuate it, and means to actuate said worm, said means including a spring pressed detent to prevent operation of said worm when said locking member is in unlocked condition, said detent including a locking plunger extending exteriorly of the mechanism.

15. In an automobile locking mechanism, the combination with the gear case and the internal gear of the steering mechanism, of a locking member having means to engage said gear to prevent operation of the steering mechanism, a worm operatively connected with said locking member to actuate it, a cap for said gear case, and means to actuate said worm, including a spring detent interlocking with said cap when the locking member is in locked position to prevent operation of said worm.

16. In an automobile locking mechanism, the combination with the gear case, its internal gear, and the steering shaft pinions intermeshing with said gear, of a locking member rotatably mounted and having portions positioned at all times between said pinions to cause said locking member to revolve in unison with the bodily revolution of said pinions, a worm to move said locking member into and out of engagement with said internal gear, and actuating means for said worm.

WILLIAM T. ESTBERG.

Witnesses:
H. S. FAIRBANKS,
C. D. McVAY.